United States Patent
Takahashi et al.

(10) Patent No.: US 11,987,307 B2
(45) Date of Patent: May 21, 2024

(54) SORTING DESTINATION IDENTIFICATION DEVICE, SORTING DESTINATION IDENTIFICATION METHOD, AND PROGRAM

(71) Applicants: KOBELCO CONSTRUCTION MACHINERY CO., LTD., Hiroshima (JP); HIROSHIMA UNIVERSITY, Hiroshima (JP)

(72) Inventors: Katsuhiko Takahashi, Hiroshima (JP); Katsumi Morikawa, Hiroshima (JP); Yasutoshi Nishi, Hiroshima (JP)

(73) Assignees: KOBELCO CONSTRUCTION MACHINERY CO., LTD., Hiroshima (JP); HIROSHIMA UNIVERSITY, Hiroshima (JP)

( * ) Notice: Subject to any disclaimer, the term of this patent is extended or adjusted under 35 U.S.C. 154(b) by 0 days.

(21) Appl. No.: 18/246,858

(22) PCT Filed: Sep. 28, 2021

(86) PCT No.: PCT/JP2021/035725
§ 371 (c)(1),
(2) Date: Mar. 28, 2023

(87) PCT Pub. No.: WO2022/071349
PCT Pub. Date: Apr. 7, 2022

(65) Prior Publication Data
US 2023/0382480 A1    Nov. 30, 2023

(30) Foreign Application Priority Data
Oct. 2, 2020 (JP) ................ 2020-167392

(51) Int. Cl.
*B62D 67/00* (2006.01)
*G06Q 50/08* (2012.01)

(52) U.S. Cl.
CPC ........... *B62D 67/00* (2013.01); *G06Q 50/08* (2013.01)

(58) Field of Classification Search
CPC .......... B07C 3/08; B07C 5/03; B65G 1/1378; B65G 43/08; B65G 61/00; B65G 1/1373; B62D 67/00; G06Q 50/08
See application file for complete search history.

(56) References Cited

U.S. PATENT DOCUMENTS

| 4,037,302 A | * | 7/1977 | Hollander | .............. B65G 37/02 29/426.3 |
| 4,905,363 A | * | 3/1990 | Boyenval | ................. B09B 5/00 414/222.03 |

(Continued)

FOREIGN PATENT DOCUMENTS

| JP | 2010-138657 A | 6/2010 |
| JP | 2017-141552 A | 8/2017 |

(Continued)

OTHER PUBLICATIONS

International Search Report dated Nov. 9, 2021 in PCT/JP2021/035725 filed on Sep. 28, 2021 (citing references 1 & 16-20 therein, 2 pages).

*Primary Examiner* — Jason L Vaughan
(74) *Attorney, Agent, or Firm* — Oblon, McClelland, Maier & Neustadt, L.L.P.

(57) ABSTRACT

A sorting destination determining device extracts first records indicating a reversal to a slewing direction of a slewing body, extracts from records before the first records a second record indicating opening of an opening/closing state, extracts from the first records a third record immediately before which the second record is registered, and determines a sorting destination of a dismantled part on the basis of a slewing angle registered in the third record.

14 Claims, 10 Drawing Sheets

(56) References Cited

U.S. PATENT DOCUMENTS

| | | | |
|---|---|---|---|
| 5,335,406 A | * | 8/1994 | Van Den Mosselaar .................... B60S 13/00 29/426.3 |
| 2017/0255895 A1 | | 9/2017 | Kozumi et al. |
| 2022/0172133 A1 | | 6/2022 | Takahashi et al. |

FOREIGN PATENT DOCUMENTS

| WO | WO 2016/125915 A1 | 8/2016 |
|---|---|---|
| WO | WO 2020/100823 A1 | 5/2020 |
| WO | WO 2020/110780 A1 | 6/2020 |
| WO | WO 2020/202788 A1 | 10/2020 |

\* cited by examiner

| TIME | NIBBLER POSITIONAL COORDINATE | | | SLEWING ANGLE | NIBBLER OPENING /CLOSING INFORMATION | |
|---|---|---|---|---|---|---|
| | X COORDINATE | Y COORDINATE | Z COORDINATE | | | |
| T1 | X1 | Y1 | Z1 | AG1 | CLOSING | ← RC1 |
| T2 | X2 | Y2 | Z2 | AG2 | CLOSING | ← RC2 |
| T3 | X3 | Y3 | Z3 | AG3 | CLOSING | ← RC3 |
| T4 | X4 | Y4 | Z4 | AG4 | OPENING | ← RC4 |
| T5 | X5 | Y5 | Z5 | AG5 | OPENING | ← RC5 |
| ⋮ | ⋮ | ⋮ | ⋮ | ⋮ | ⋮ | |

| place | angle | X | Y | Z | opentime | opendis | openangle |
|---|---|---|---|---|---|---|---|
| car | 2.101369 | 5911.189 | -61.114 | 79.85 | 0.6 | 188.698 | -0.971 |
| small | -145.852 | -5223.03 | 3345.294 | 894.16 | 0.6 | 292.5764 | -2.701 |
| car | -36.0046 | 4362.87 | 3349.408 | 1457.778 | 0.1 | 44.34822 | 0.434 |
| small | -67.9236 | 2128.478 | 5672.629 | 961.006 | 0.4 | 299.7027 | -1.103 |
| car | 5.459369 | 5865.209 | -405.038 | 692.304 | 0.8 | 361.417 | -0.229 |
| car | 4.787369 | 5258.157 | -301.165 | -130.163 | 2.4 | 1330.199 | 6.823 |
| car | 4.478369 | 5192.424 | -269.293 | -297.258 | 0.2 | 9.719625 | 0.039 |
| car | -3.60263 | 5496.107 | 491.691 | -94.689 | 2.2 | 1372.366 | -7.207 |
| harnes | 32.26337 | 5828.571 | -3468.16 | 642.688 | 1.9 | 900.1118 | 7.525 |
| car | 10.39737 | 6467.889 | -1011.48 | 1248.26 | 0.1 | 177.3925 | -0.082 |
| car | 10.62837 | 6770.85 | -1086.86 | 1528.02 | 0 | 0 | 0 |
| car | 10.31037 | 4388.588 | -679.434 | 25.137 | 0 | 0 | 0 |
| car | 10.88837 | 6006.911 | -992.193 | 193.167 | 0.4 | 1114.9 | -0.065 |
| car | -3.39463 | 8595.307 | 737.42 | 364.777 | 0.3 | 62.12462 | 0.363 |
| car | -1.10163 | 8232.393 | 375.373 | 213.754 | 0.3 | 160.4888 | 0.138 |

$t$ ↑ ↑ ↑ ↑ ↑ ↑ ↑ ↑
 $\underbrace{d_1 \quad d_2 \quad d_3 \quad d_4 \quad d_5 \quad d_6 \quad d_7}_{v}$

- EXPLANATORY VARIABLE (SUBJECT DATA) $\quad v=(d_1, d_2, d_3, d_4, d_5, d_6, d_7)$
- TARGET VARIABLE (OBJECT) $\quad t$
- TEACHING DATA SET $\quad S=\{(v, t)\}$

| PROPOSED METHOD CORRECT DETERMINATION RATE | | VALIDATION DATA | | | | | | AVERAGE |
|---|---|---|---|---|---|---|---|---|
| | | 15 | 16 | 17 | 18 | 19 | 20 | |
| TEACHING DATA | 15 | | 93.8% | 88.9% | 100.0% | 100.0% | 100.0% | 96.0% |
| | 16 | 55.6% | | 100.0% | 78.6% | 100.0% | 78.9% | 80.5% |
| | 17 | 83.3% | 100.0% | | 86.7% | 100.0% | 82.6% | 88.6% |
| | 18 | 94.4% | 100.0% | 94.4% | | 100.0% | 100.0% | 97.4% |
| | 19 | 77.8% | 80.0% | 100.0% | 78.6% | | 95.0% | 87.1% |
| | 20 | 82.4% | 100.0% | 88.9% | 100.0% | 100.0% | | 93.1% |
| AVERAGE | | 78.7% | 94.7% | 94.4% | 87.3% | 100.0% | 91.0% | 91.3% |

| CORRECT DETERMINATION RATE | | VALIDATION DATA | | | | | | AVERAGE |
|---|---|---|---|---|---|---|---|---|
| | | 15 | 16 | 17 | 18 | 19 | 20 | |
| TEACHING DATA | 15 | | 93.8% | 83.3% | 92.9% | 100.0% | 94.7% | 92.9% |
| | 16 | 77.8% | | 94.4% | 78.6% | 87.5% | 73.7% | 82.4% |
| | 17 | 83.3% | 100.0% | | 86.7% | 87.5% | 69.2% | 85.3% |
| | 18 | 94.4% | 93.3% | 88.9% | | 100.0% | 89.5% | 93.2% |
| | 19 | 88.9% | 80.0% | 100.0% | 100.0% | | 95.0% | 92.8% |
| | 20 | 94.1% | 93.3% | 88.9% | 100.0% | 100.0% | | 95.3% |
| AVERAGE | | 87.6% | 92.1% | 91.1% | 91.5% | 95.0% | 83.5% | 89.3% |

| WRONG DETERMINATION NUMBER | VALIDATION DATA | | | | | | AVERAGE |
|---|---|---|---|---|---|---|---|
| | 15 | 16 | 17 | 18 | 19 | 20 | |
| TEACHING DATA 15.16 | | | 88.9% | 100% | 100% | 100% | 97.2% |
| 15.17 | | 100% | | 100% | 100% | 100% | 100.0% |
| 15.18 | | 93.3% | 94.4% | | 100% | 100% | 96.9% |
| 15.19 | | 100% | 94.4% | 100% | | 100% | 98.6% |
| 15.20 | | 93.8% | 88.9% | 100% | 100% | | 95.7% |
| 16.17 | 84.2% | | | 100% | 100% | 95% | 94.8% |
| 16.18 | 94.1% | | 88.9% | | 100% | 100% | 95.8% |
| 16.19 | 83.3% | | 88.9% | 100% | | 100% | 93.1% |
| 16.20 | 82.4% | | 84.2% | 100% | 100% | | 91.6% |
| 17.18 | 94.4% | 100% | | | 100% | 95.0% | 97.4% |
| 17.19 | 88.9% | 100% | | 93.3% | | 82.6% | 91.2% |
| 17.20 | 88.9% | 100% | | 100% | 100% | | 97.2% |
| 18.19 | 94.4% | 100% | 100% | | | 100% | 98.6% |
| 18.20 | 100% | 100% | 88.9% | | 100% | | 97.2% |
| 19.20 | 83.3% | 100% | 94.4% | 100% | | | 94.4% |
| AVERAGE | 89.4% | 98.7% | 91.2% | 99.3% | 100.0% | 97.3% | 96.0% |

SORTING DESTINATION IDENTIFICATION DEVICE, SORTING DESTINATION IDENTIFICATION METHOD, AND PROGRAM

TECHNICAL FIELD

The present invention relates to a sorting destination determining device and a technique relevant thereto.

BACKGROUND ART

There has been conventionally known a working machine (dismantling machine) having a crusher (nibbler) attached to a leading end of a working attachment. For example, a dismantling machine (1) disclosed in Patent Literature 1 has a crusher (9) attached to a leading end of an arm (8) that is a part of an attachment (4) (see FIG. 1 of Patent Literature 1).

In this regard, a car dismantling machine having a nibbler is used for an operation of collecting a part (dismantled part) of a disused car that is recyclable, e.g., a harness and a small part. In the operation, the car dismantling machine is controlled to collect a part from the disused car and sort the collected part to one of sorting destinations.

Specifically, actions are repeated of gripping a part (e.g., a harness) by the nibbler from the disused car in an operation area, stewing while gripping the part, releasing the part to place it at one of the sorting destinations, and returning to the operation area.

For analysis on the operation above, a method can be considered that involves taking images of the operation and manually registering designated information while watching the taken video, but takes considerable time and effort, thus cannot be said to be always effective.

In contrast, the present inventors have been studying a method for analysis on the operation with only operational data (chronological data) acquired in the working machine (e.g., a car dismantling machine) during the operation above. An objective thereof is to accurately determine using only the operational data a sorting destination of a sorted object (e.g., a dismantled part) among the sorting destinations.

For the objective above, the present inventors initially studied a method in which a sorting destination of a dismantled part (object) is determined on the basis of the coordinate of a release point of the nibbler, but could not achieve a sufficient accuracy. An analysis on the cause of the unachieved accuracy showed that dismantled parts gripped by the nibbler are tossed to respective sorting destinations with momentum of slewing when sorted to the sorting destinations, i.e., the dismantled parts gripped by the nibbler are released away from the respective sorting destinations consequently.

In other words, the fact was found out that, since the release point of the nibbler is likely actually away from the sorting destination, a determination of the sorting destination based on the coordinate of the release point of the nibbler is likely inaccurate.

CITATION LIST

Patent Literature

Patent Literature 1: Japanese Unexamined Patent Publication No. 2017-141552

SUMMARY OF INVENTION

An object of the present invention is to provide a technique that enables accurate determination of a sorting destination of an object from operational data of a working machine which performs a sorting operation of sorting an object to a sorting destination among a plurality of sorting destinations under control by an operator.

To achieve the object, a sorting destination determining device according to an aspect of the present disclosure for determining a sorting destination of an object from operational data of a working machine including a slewing body and a holder for holding an object and configured to perform a sorting operation of sorting an object to a sorting destination among a plurality of sorting destinations under control by an operator includes: an acquisition part for acquiring operational data having a plurality of chronologically registered records, each record including a slewing angle of the slewing body and a holding state of the holder which are associated with each other; an extraction part for extracting from the records first records indicating a reversal to a slewing direction of the slewing body on the basis of the slewing angles registered in the operational data. extracting from the records before the first records a second record indicating releasing of the holding state, and extracting from the first records a third record immediately before which the second record is registered; and a determination part for determining a sorting destination of the object on the basis of a slewing angle registered in the third record.

This configuration enables accurate determination of a sorting destination of an object from operational data of a working machine that performs a sorting operation of sorting an object to a sorting destination among a plurality of sorting destinations under control by an operator.

BRIEF DESCRIPTION OF DRAWINGS

FIG. 3 is a table of operational data which are obtained by sampling during the sorting operation.

FIG. 6 is a table showing explanatory variables and target variables for use in machine learning by random forest.

FIG. 8 is a table showing results of validation of a predictive model (sort accuracy according to decision trees).

FIG. 9 is a table showing results of validation of a predictive model (a comparative example that ignores a stewing angle).

FIG. 10 is a table showing results of validation of a predictive model (another comparative example that involves more teaching data).

DESCRIPTION OF EMBODIMENT

1. Embodiment

A sorting destination determining device according to an embodiment of the invention will be described with reference to FIG. 1 to FIG. 10. Hereinafter, a dismantling machine 10 controlled by an operator serves as an exemplary working machine (see FIG. 1). Further, a sorting destination determining device 1 that executes a sorting destination determination which will be described later serves as an exemplary sorting destination determining device (see FIG. 4).

Figure 1:
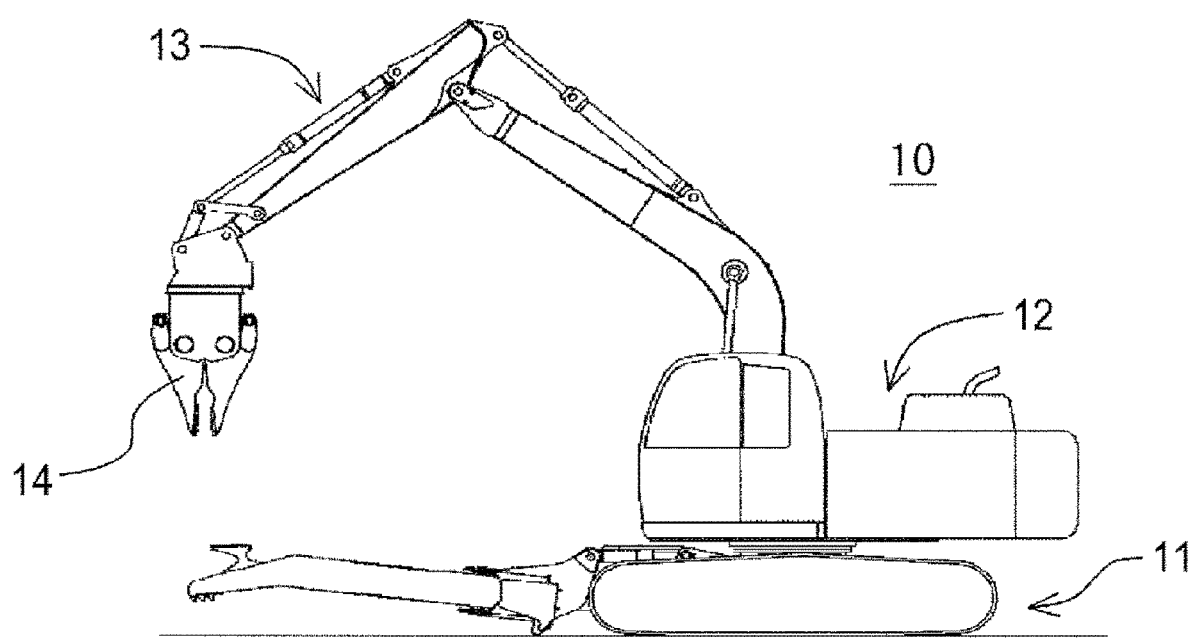
FIG. 1 is a side view of a dismantling machine according to an embodiment of the invention.

As shown in FIG. 1, the dismantling machine 10 includes a lower traveling body 11, an upper slewing body 12, and an attachment 13. The attachment 13 has a nibbler 14 attached to a leading end thereof, which is adapted for nipping and taking out a dismantled part (harness or small part) from a dismantlement target (e.g., a car).

The upper slewing body 12 is an exemplary slewing body. The nibbler 14 is an exemplary holder. The dismantled part is an exemplary object.

The dismantling machine 10 performs a sorting operation under control by an operator of gripping and taking out the dismantled part such as a harness or a small part from the dismantlement target such as a car, and sorting the dismantled part to a certain sorting destination.

Figure 2:
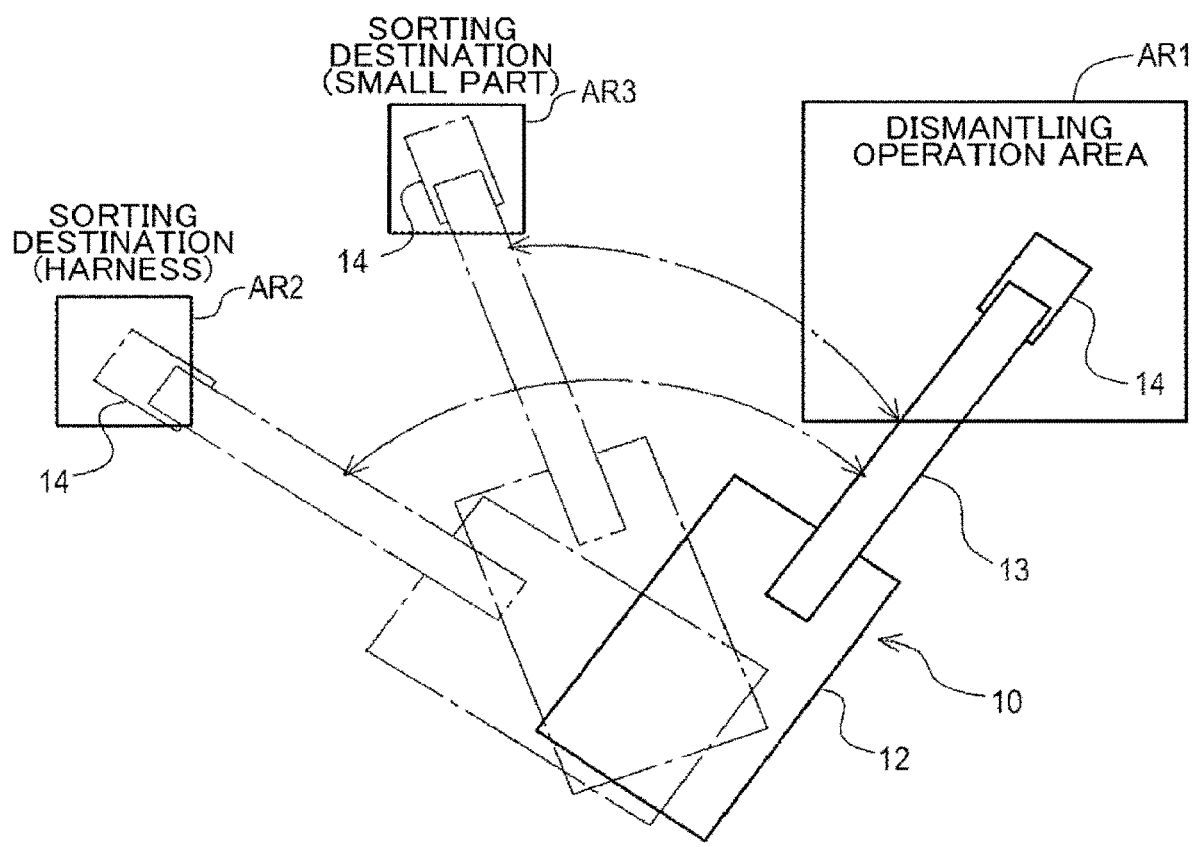
FIG. 2 is a plan view schematically showing a sorting operation of a dismantled part by the dismantling machine.

Specifically, as shown in FIG. 2, the dismantling machine 10 nips and holds the dismantled part (harness or small part) by the nibbler 14 in a dismantling operation area AR1 and slews in a certain direction (counterclockwise in FIG. 2) while holding the dismantled part by the nibbler 14.

In a case that the dismantling machine 10 holds a harness by the nibbler 14, the dismantling machine 10 releases the harness in the vicinity of a harness sorting destination AR2. On the other hand, in a case that the dismantling machine 10 holds a small part by the nibbler 14, the dismantling machine 10 releases the small part in the vicinity of a small part sorting destination AR3. Thus, the harness is sorted to the harness sorting destination AR2, and the small part is sorted to the small part sorting destination AR3.

The dismantling machine 10 thereafter slews in a direction opposite to the certain direction (clockwise in FIG. 2) and returns to the dismantling operation area AR1. The dismantling machine 10 repeats the actions as described above under control by the operator.

The dismantling machine 10 acquires various kinds of operational information at a predetermined sampling interval during the operation described above, and accumulates them as operational data DT1 shown in FIG. 3. Specifically, the dismantling machine 10 acquires a positional coordinate of the nibbler 14, the slewing angle of the upper slewing body 12, and information on opening/closing of the nibbler 14 as the operational information, and accumulates them in the operational data DTI.

As shown in FIG. 3, the operational data DT1 has chronologically registered records RC1, RC2, RC3, each including a sampling time, the positional coordinate of the nibbler 14, the slewing angle of the upper slewing body 12, and the information on opening/closing of the nibbler 14 that are associated with each other.

The positional coordinate of the nibbler 14 includes, for example, respective values for the X coordinate, the Y coordinate, and the Z coordinate of the nibbler 14.

The slewing angle of the upper slewing body 12 represents, for example, a value for a slewing angle of the upper stewing body 12 with respect to a reference position (e.g., a position at which a dismantled part is taken out in the dismantling operation area. ARI).

The information on opening/closing of the nibbler 14 indicates, for example, an opening/closing state based on an output value of a stroke sensor provided on a cylinder for opening and closing the nibbler 14. The opening/closing state indicates "opening" which means that the nibbler 14 is in the opening state, or "closing" which means that the nibbler 14 is in the closing state.

Figure 4:
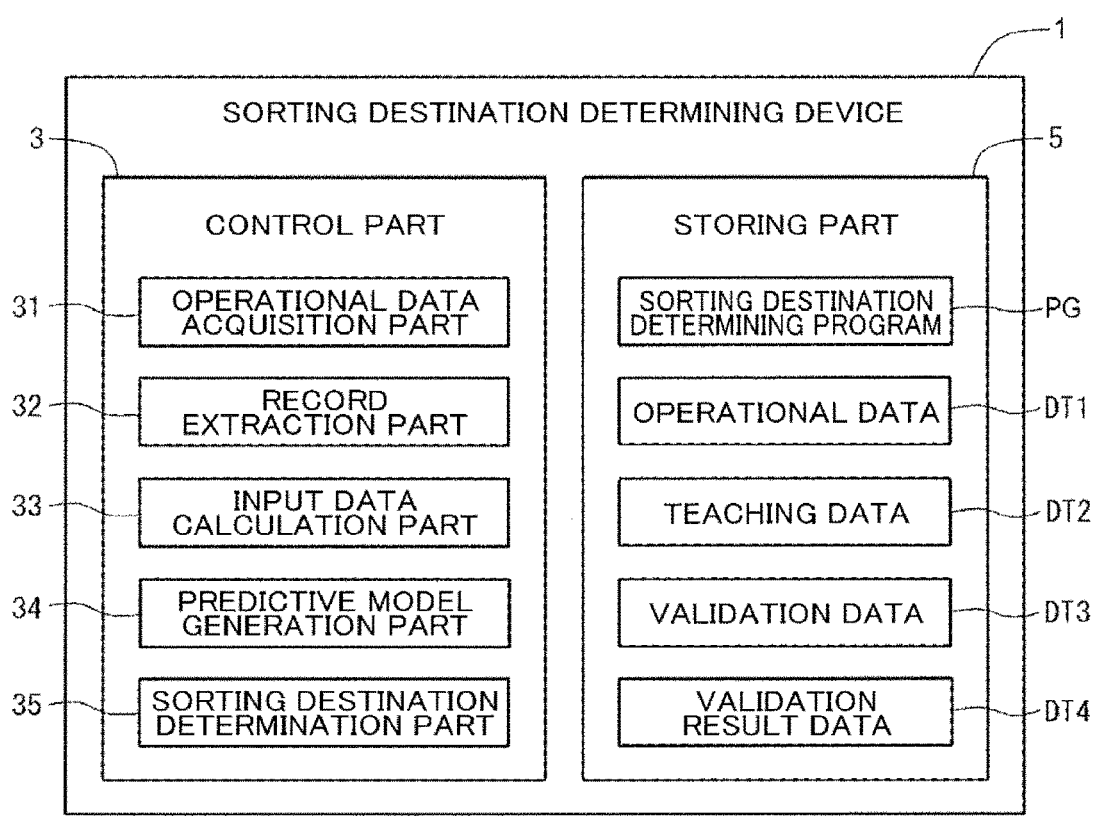
FIG. 4 is a functional block diagram of a sorting destination determining device according to the embodiment of the invention.

Next, the sorting destination determining device 1 will be described with reference to FIG. 4. The sorting destination determining device I is a computer for determining a sorting destination of a dismantled part on the basis of the operational data DTI described above. As shown in FIG. 4, the sorting destination determining device 1 includes a control part 3 and a storing part 5.

The control part 3 includes a central processing unit (CPU) and executes various kinds of calculation on the basis of a program and data stored in the storing part 5.

As shown in FIG. 4. the control part 3 includes an operational data acquisition part 31 (an exemplary acquisition part), a record extraction part 32 (an exemplary extraction part), an input data calculation part 33 (an exemplary calculation part), a predictive model generation part 34 (an exemplary generation part), and a sorting destination determination part 35 (an exemplary determination part).

The operational data acquisition part 31 acquires the operational data DTI registered in the storing part 5.

The record extraction part 32 extracts from the operational data DTI a record that meets a certain condition.

The input data calculation part 33 generates input data that is an explanatory variable used for the random forest that is an algorithm for machine learning.

The predictive model generation part 34 generates a predictive model for determining a sorting destination of a dismantled part using the random forest being an algorithm for machine learning.

The sorting destination determination part 35 determines the sorting destination of the dismantled part during the operation using the predictive model.

The storing part 5 includes a memory and a magnetic disk device, and stores various programs and data. The storing part 5 also functions as a working memory for the control part 3. The storing part 5 may include an information storing medium, e.g., a flash memory or an optical disk, or may include a reading device that reads information from the information storing medium.

The configuration of hardware described above is merely an example. An exemplary case in which the sorting destination determining device 1 has the storing part 5 inside is described above as the configuration of hardware, which is not limited to this. The sorting destination determining device 1 may be externally connected to a storing device communicable therewith.

As shown in FIG. 4, the storing part 5 has a sorting destination determining program PG, the operational data DTI, teaching data DT2, validation data DT3, and validation result data DT4.

The sorting destination determining program PG is a program for executing a sorting destination determination (a process shown by the flowchart in FIG. 5) of determining a sorting destination of a dismantled part during the operation.

As described above, the operational data DT1 is accumulation data of the operational information acquired by the dismantling machine 10 at a predetermined sampling interval during the operation (see FIG. 3).

The teaching data DT2 is input data and output data used for machine learning. Specifically, the teaching data DT2 includes explanatory variables v=(d1, d2, d3, d4, d5, d6, d7) and a target variable t used in the random forest. The teaching data DT2 is operational data DT1 that is used for machine learning and is associated with a target variable.

The explanatory variables v=(d1, d2, d3, d4, d5, d6, d7) are variables calculated in the input data calculation part 33. The target variable t indicates an actual sorting destination (sorting destination that has been visually confirmed by a worker by way of the video taken during the operation).

The validation data DT3 is data to validate a predictive model generated through machine learning. The validation data DT3 is data that is not used as the teaching data DT2 in learning by the random forest. In other words, the validation data DT3 is the operational data DTI other than the operational data DTI that is used as the teaching data DT2. The validation data DT3 includes explanatory variables v=(d1,d2, d3, d4, d5, d6, d7).

The validation result data DT4 indicates results of validation of the predictive model generated through machine learning by the validation data DT3.

Figure 5:
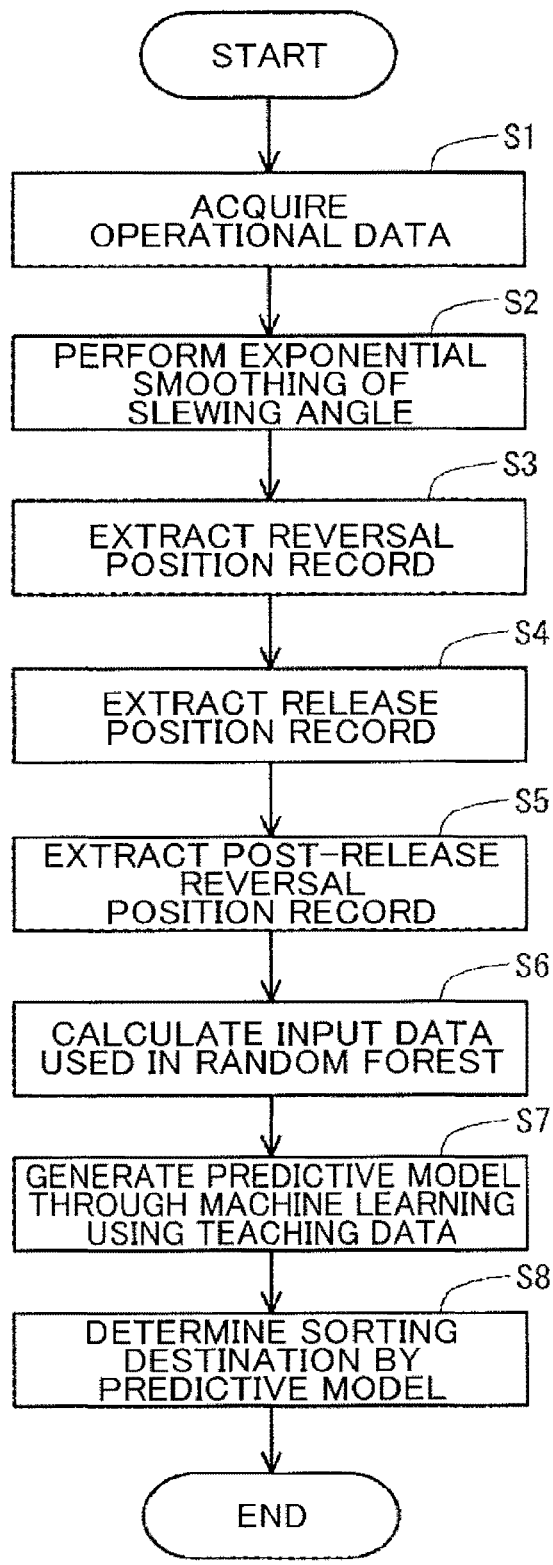
FIG. 5 is a flowchart of a sorting destination determination by a sorting destination determining program.

Next, the process executed by the sorting destination determining program PG will be described with reference to FIG. 5. Hereinafter, "Step S" is simply referred to as "S".

In S1, the operational data acquisition part 31 acquires the operational data DT1 from the storing part 5.

Next, in S2, the record extraction part 32 performs exponential smoothing of the slewing angles chronologically registered in the operational data DT1.

Next, in S3, the record extraction part 32 extracts, on the basis of the exponentially smoothed slewing angles, all of the records registered at the time when the stewing direction of the dismantling machine 10 in the certain direction is reversed, as reversal position records (exemplary first records).

Specifically, the record extraction part 32 extracts, as the reversal position records, all of the records registered at the time when the sign of the gradient of a function of the exponentially smoothed stewing angles is reversed (from plus to minus or from minus to plus).

The exponentially smoothed slewing angles have the feature of continuing to increase (or decrease) while the upper slewing body 12 slews in the certain direction and continuing to decrease (or increase) while the upper slewing body 12 slews in a direction opposite to the certain direction. In other words, a reversal to the slewing direction of the upper slewing body 12 causes a reversal of the sign of the gradient of the function of the exponentially smoothed slewing angles. In S3, this feature is used to determine the reversal position records.

In this regard, the stewing angles in the original data that are registered in the operational data. DTI neither monotonically increase nor monotonically decrease, and the original data includes a noise. Therefore, if the original data on the slewing angles is used in the extraction of the reversal position records (S3), a wrong reversal position record may be extracted. Thus, in the embodiment, the slewing angles in the original data are exponentially smoothed in S2, and the exponentially smoothed slewing angles are used to determine the reversal position records in S3.

In S4, the record extraction part 32 extracts, from records registered before a reversal position record, a record with registration of "opening" in the information on opening/closing of the nibbler 14, as a release position record (an exemplary second record). Specifically, the record extraction part 32 extracts, from a predetermined number of records registered before a reversal position record, the record with the first registration of "opening" in the information on opening/closing of the nibbler 14, as the release position record.

In the embodiment, a record registered before a reversal position record does not merely mean the record immediately before the reversal position record, but means a predetermined number of records registered before a reversal position record. The predetermined number is set according to the sampling interval for the operational data DTI.

In S5, the record extraction part 32 extracts, from the reversal position records, a reversal position record immediately before which a release position record is registered as a post-release reversal position record (an exemplary third record), Specifically, the record extraction part 32 extracts a record that is registered at the time when the stewing direction is reversed after the nibbler 14 releases, as the post-release reversal position record. In other words, a record that is registered at the time when the stewing is reversed but the nibbler 14 remains closed is not extracted as the post-release reversal position record.

In S6, the input data calculation part 33 calculates input data, i.e., explanatory variables v=(d1, d2, d3, d4, d5, d6, d7) used in the random forest being an algorithm for machine learning.

Specifically, the input data calculation part 33 calculates the input data (explanatory variables v) using the operational information registered in the release position record extracted in S4 and the operational information registered in the post-release reversal position record extracted in S5.

More specifically, as shown in FIG. 6, the input data calculation part 33 calculates, as the explanatory variables v, an angular deviation d1 of a slewing angle at a reversal position, positional coordinates d2, d3, and d4 of the nibbler 14 at a release position, and an elapsed time d5, a moved distance d6, and a movement slewing angle d7 from the release position to the reversal position. The reversal position is a position of the nibbler 14 at the time when the upper slewing body 12 is reversed. The release position is a position of the nibbler 14 at the time when the nibbler 14 releases. The moved distance d6 is a distance from the release position to the reversal position. The movement slewing angle d7 is a slewing angle of the upper slewing body 12 from the release position to the reversal position. The angular deviation dl is an angular deviation of a slewing angle from an averaged slewing angle during the operation.

The input data calculation part 33 calculates the explanatory variables v=(d1, d2, d3, d4, d5, d6, d7) for all of the extracted release position records and the post-release reversal position records.

The teaching data DT2 has the explanatory variables v=(d1, d2, d3. d4, d5, d6, d7) and the target variable t that are associated with each other. As described above, the target variable t indicates a sorting destination (correct sorting destination) that has been visually confirmed by a worker by way of the video taken during the operation.

For convenience of explanation, the teaching data DT2 is also referred to as teaching data set S={(v, t)} (see FIG. 6).

In S7, the predictive model generation part 34 generates a predictive model through the random forest. The random forest is a known algorithm for machine learning; it is an ensemble learning algorithm that performs classification, regression, and clustering on the basis of results obtained by a plurality of decision trees (weak classifiers).

In the embodiment, which concerns a classification problem of determining a sorting destination of a dismantled part among the sorting destinations, a classification tree is used as the decision tree in the random forest.

Figure 7:
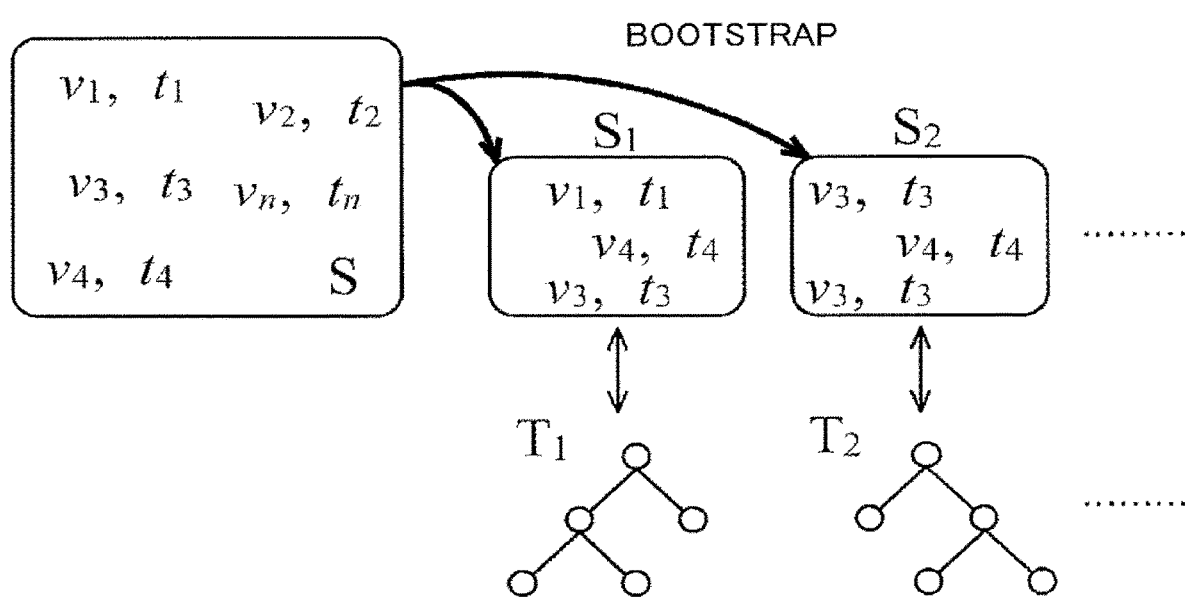
FIG. 7 is a diagram showing generation of a decision tree in the random forest from a teaching data set.

As shown in FIG. 7, the predictive model generation part 34 randomly samples training data S1, S2, SN used for learning of an individual decision tree from the teaching data set S by bootstrap.

Firstly, the predictive model generation part 34 randomly samples M variables used for branches from the training data Si to generate a decision tree T1. The predictive model generation part 34 repeats such a process on the training data S2, ..., SN to finally generate N decision trees T1, T2, ..., TN.

Each decision tree is split to a predetermined depth. The Gini coefficient is used as a measure for splitting a root node and an internal node. A target variable t is set to a leaf node.

In S8, the sorting destination determination part 35 inputs validation data DT3 to the N decision trees T1, T2, ..., and TN, and determines a sorting destination of a dismantled part by decision by majority based on respective sorting destinations obtained by classification by the decision trees T1, T2, and TN. The sorting destination of each dismantled part during the operation is thus classified into any one of the dismantling operation area AR1, the harness sorting destination AR2, and the small part sorting destination AR3.

The validation result data DT4 (DT41) in FIG. 8 shows results of validation of the sort accuracy by use of the validation data DT3 after the generation of the N decision trees T1, T2, ..., TN (predictive model) by use of the teaching data DT2.

Specifically, the first row of the validation result data DT41 shows results of the validation of a predictive model (N decision trees T1, T2, TN) obtained from data No. 15 serving as the teaching data DT2 by use of data No. 16 to 20 serving as the validation data DT3 after the generation of the predictive model.

Further, the second row of the validation result data DT41 shows results of the validation of a predictive model obtained from data No. 16 serving as the teaching data DT2 by use of data No. 15, and 17 to 20 serving as the validation data DT3 after the generation of the predictive model. The third to sixth rows of the validation result data DT41 show results of the validation of predictive models by the same standard.

The validation result data DT41 shows the sort accuracy of 91.3% on average (see the boldfaced cell in FIG. 8). The conventional method (clustering without the random forest) results in only the sort accuracy of 72% on average, from which it can be seen that the sort accuracy is remarkably improved.

The validation result data DT4 (DT42) in FIG. 9 shows results of the validation of the sort accuracy of a predictive model (comparative example) including fewer explanatory variables than in the embodiment above. In the comparative example, a predictive model is generated that includes the explanatory variables v=(d2, d3, d4), but excludes the explanatory variables v of: the angular deviation d1 of a stewing angle at the reversal position; and the elapsed time d5, the moved distance d6, and the movement slewing angle d7 from the release position to the reversal position. In other words, in the comparative example, a predictive model is generated by use of only the information on the release position of the nibbler 14.

As shown in FIG. 9, the validation result data DT42 shows the sort accuracy of 89.3% on average (see the boldfaced cell in FIG. 9). Accordingly, the sort accuracy is improved as in the embodiment above, in comparison with the conventional method (clustering without the random forest).

However, the sort accuracy in the comparative example is not as high as that in the embodiment above. Therefore, it can be seen that the angular deviation d1 of the slewing angle at the reversal position, and the elapsed time d5, the moved distance d6, and the movement stewing angle d7 from the release position to the reversal position contribute to the improvement in the sort accuracy.

As described above, in the actual operation, when the dismantled parts gripped by the nibbler 14 are sorted to the respective sorting destinations, the dismantled parts gripped by the nibbler 14 are released away from the respective sorting destinations to be tossed to the respective sorting destinations. Therefore, the release point of the nibbler 14 is likely actually away from the sorting destination. Accordingly, a determination of a sorting destination based only on the information on the release position of the nibbler 14 is presumed to cause a high likelihood that the sorting destination cannot be accurately determined.

On the other hand, the upper slewing body 12 slightly slews due to the inertia after tossing the dismantled part released by the nibbler 14. Therefore, the reversal position where the slewing of the upper slewing body 12 is reversed is presumed to likely agree with the sorting destination of the dismantled part. Thus, in the embodiment, the information on the slewing angle of the upper slewing body 12 as well as the information on the release position of the nibbler 14 is used as the input data (explanatory variables) in the random forest.

A comparison between the validation result data DT41 in FIG. 8 and the validation result data DT42 in FIG. 9 makes it clear that it is effective to take the information on the slewing angle of the upper slewing body 12 into consideration in the determination of the sorting destination of the dismantled part. Thus, it can be said that the presumption above is correct.

The validation result data DT4 (DT43) in FIG. 10 shows results of validation of the sort accuracy of a predictive model generated by use of more teaching data DT2.

Specifically, the first row of the validation result data DT43 shows results of the validation of a predictive model obtained from data No. 15 and data No. 16 serving as the teaching data DT2 by use of data No. 17 to 20 serving as the validation data DT3 after the generation of the predictive model.

Further, the second row of the validation result data DT43 shows results of the validation of a predictive model obtained from data No. 15 and data No. 17 serving as the teaching data DT2 by use of data No. 16, and 18 to 20 serving as the validation data DT3 after the generation of the predictive model. The third row and below of the validation result data DT43 show results of the validation of predictive models by the same standard.

The validation result data DT43 shows the sort accuracy of 96.0% on average (see the boldfaced cell in FIG. 10). Accordingly, it can be seen that the predictive model that involves more teaching data DT2 can achieve a higher sort accuracy than the averaged sort accuracy (91.3%) in the validation result data DT41.

In the embodiment described above, in the sorting operation of the dismantled part, a sorting destination of each dismantled part (harness or small part) during the operation can be accurately determined by use of the N decision trees T1, T2, ..., TN resulting from machine learning by the random forest.

Particularly, in the embodiment, the information on the slewing angle of the upper slewing body 12 as well as the information on the release position of the nibbler 14 is used as the input data (explanatory variables) in the random forest. Therefore, a high sort accuracy can be achieved in the sorting operation of the dismantled part.

2. Modification

The sorting destination determining device of the present disclosure is not limited to the embodiment above, and may be varied or modified within the scope of the claims.

For example, a case where the predictive model is generated through the random forest is described in the embodiment above, which is not limited to this. The predictive model may be generated through an algorithm for machine learning other than the random forest.

Further, a case where a sorting destination of a dismantled part is determined using the predictive model resulting from the random forest is described in the embodiment above, which is not limited to this. For example, a determination as to whether a slewing angle registered in a post-release reversal position record is within a predetermined range may serve as the determination of the sorting destination of the dismantled part.

Specifically, a slewing angle range RG1 corresponding to the harness sorting destination AR2 and a slewing angle range RG2 corresponding to the small part sorting destination AR3 may be preset; in a case that the slewing angle registered in the post-release reversal position record is within the slewing angle range RG1, the sorting destination of the dismantled part may be determined to be the harness sorting destination AR2, and in a case that the slewing angle registered in the post-release reversal position record is within the slewing angle range RG2, the sorting destination of the dismantled part may be determined to be the small part sorting destination AR3.

3. Modification

The operational data acquisition part 31 may acquire from the dismantling machine 10 operational data DT1 in which the sorting destination is undetermined; the input data calculation part 33 may generate input data from the acquired operational data DT1; and the sorting destination determination part 35 may determine the sorting destination by inputting the generated input data to a learned predictive model.

4. Modification

The sorting destination determining device 1 may be communicably connected to the dismantling machine 10 through a network such as the Internet and acquire the operational data from the dismantling machine 10.

SUMMARY OF EMBODIMENT

A sorting destination determining device according to an aspect of the present disclosure for determining a sorting destination of an object from operational data of a working machine including a slewing body and a holder for holding an object and configured to perform a sorting operation of sorting an object to a sorting destination among a plurality of sorting destinations under control by an operator includes: an acquisition part for acquiring operational data having a plurality of chronologically registered records, each record including a slewing angle of the slewing body and a holding state of the holder which are associated with each other; an extraction part for extracting from the records first records indicating a reversal to a slewing direction of the slewing body on the basis of the slewing angles registered in the operational data, extracting from the records before the first records a second record indicating releasing of the holding state, and extracting from the first records a third record immediately before which the second record is registered; and a determination part for determining a sorting destination of the object on the basis of a slewing angle registered in the third record.

In this configuration, the third record immediately before which the second record indicating releasing of the holding state is registered is extracted from the first records indicating the reversal to the slewing direction of the slewing body, and the sorting destination of the object is determined on the basis of the slewing angle registered in the third record. Therefore, a sorting destination of an object can be accurately determined from operational data of a working machine that performs a sorting operation of sorting an object to a sorting destination among a plurality of sorting destinations under control by an operator.

Preferably, in the sorting destination determining device, the record may further include a positional coordinate of the holder, and the determination part may determine a sorting destination of the object on the basis of the slewing angle registered in the third record and the positional coordinate registered in the second record.

In this configuration, the determination part determines the sorting destination of the object on the basis of the slewing angle registered in the third record and the positional coordinate registered in the second record. Thus, the soiling destination of the object can be accurately determined.

Preferably, the sorting destination determining device may further include: a calculation part for calculating, on the basis of the third record and the second record, input data including information on a slewing angle in the reversal to the slewing direction and coordinate information on a release position at which the object is released; and a generation part for generating a predictive model for determining a sorting destination of the object, by performing a machine learning with teaching data being the input data and output data indicating a sorting destination of the object, and the determination part may determine a sorting destination of the object by the predictive model.

In this configuration, the sorting destination of the object is determined by the predictive model obtained from machine learning with the teaching data including the input data calculated on the basis of the third record and the second record, and the output data indicating the sorting destination of the object. Thus, the sorting destination can be accurately determined.

Preferably, in the sorting destination determining device, the predictive model may include a plurality of decision trees generated by a random forest, the input data may be an explanatory variable in the random forest, the output data may be a target variable in the random forest, and the determination part may determine a sorting destination of the object using the decision trees generated through the machine learning with the teaching data.

In this configuration, the predictive model includes the plurality of decision trees generated by the random forest. Thus, the sorting destination of the object can be accurately determined.

Preferably, in the sorting destination determining device, the extraction part may perform exponential smoothing of the slewing angles in the operational data, and may extract first records on the basis of the exponentially smoothed slewing angles.

In this configuration, the first records are extracted on the basis of the exponentially smoothed slewing angles. Thus, the first records are extracted accurately.

Preferably, in the sorting destination determining device, the sorting operation may include: an operation of holding the object in an operation area, slewing in a certain direction while holding the object, releasing the object to thereby place the object at a sorting destination of the sorting destinations, and returning to the operation area by slewing in a direction opposite to the certain direction; and a repetition of the operation.

This configuration enables accurate determination of the sorting destination in the sorting operation that is repetition of holding an object, slewing to a sorting destination, releasing the object, and slewing to an operation area.

Preferably, in the sorting destination determining device, the operational data may be sample data which have been obtained during the time when the working machine is in operation, and the record may further include a sampling time.

In this configuration, the record includes a sampling time during the operation. Thus, the time of the reversal to the slewing direction and the time of the release of the object can be accurately determined.

Preferably, in the sorting destination determining device, the slewing angle may be a slewing angle to a reference position of the working machine.

This configuration enables accurate determination of the slewing angle. Preferably, in the sorting destination determining device, the information on the slewing angle in the reversal to the slewing direction may include the stewing angle registered in the third record.

This configuration enables accurate determination of information on the slewing angle in the reversal to the slewing direction.

Preferably, in the sorting destination determining device, the coordinate information on the release position may include the positional coordinate of the holder registered in the second record.

This configuration enables accurate determination of the coordinate information on the release position.

Preferably, in the sorting destination determining device, the input data may further include an elapsed time until the slewing direction of the slewing body is reversed after the holder releases, and a moved distance of the slewing body until the slewing direction of the slewing body is reversed after the holder releases.

In this configuration, the input data includes the elapsed time and the moved distance until the slewing direction of the slewing body is reversed after the holder releases. Thus, the sorting destination can be accurately determined.

Preferably, in the sorting destination determining device, the second record may be the record that indicates the first releasing of the holding state among a predetermined number of records before the first record.

This configuration enables accurate determination of the release timing of the holder before the stewing body is reversed.

A sorting destination determining method according to another aspect of the present disclosure for a sorting destination determining device for determining a sorting destination of an object from operational data of a working machine including a slewing body and a holder for holding an object and configured to perform a sorting operation of sorting an object to a sorting destination among a plurality of sorting destinations under control by an operator includes: acquiring operational data having a plurality of chronologically registered records, each record including a slewing angle of the stewing body and a holding state of the holder which are associated with each other; extracting from the records first records indicating a reversal to a stewing direction of the slewing body on the basis of the slewing angles registered in the operational data, extracting from the records before the first records a second record indicating releasing of the holding state, and extracting from the first records a third record immediately before which the second record is registered; and determining a sorting destination of the object on the basis of a slewing angle registered in the third record.

A program according to still another aspect of the present disclosure for causing a computer to serve as a sorting destination determining device for determining a sorting destination of an object from operational data of a working machine including a slewing body and a holder for holding an object and configured to perform a sorting operation of sorting an object to a sorting destination among a plurality of sorting destinations under control by an operator causes the computer to execute a process of: acquiring operational data having a plurality of chronologically registered records, each record including a slewing angle of the slewing body and a holding state of the holder which are associated with each other; extracting from the records first records indicating a reversal to a slewing direction of the working machine on the basis of the slewing angles registered in the operational data, extracting from the records before the first records a second record indicating releasing of the holding state, and extracting from the first records a third record immediately before which the second record is registered; and determining a sorting destination of the object on the basis of a slewing angle registered in the third record.

INDUSTRIAL APPLICABILITY

As described above, a sorting destination determining device of the invention is suitable for accurate determination of a sorting destination of an object in a sorting operation of sorting an object to a sorting destination among a plurality of sorting destinations under control by an operator.

The invention claimed is:

1. A sorting destination determining device for determining a sorting destination of an object from operational data of a working machine including a slewing body and a holder for holding the object and configured to perform a sorting operation of sorting the object to a sorting destination among a plurality of sorting destinations under control by an operator, the sorting destination determining device comprising:
   an acquisition part for acquiring the operational data having a plurality of chronologically registered records, each record including a slewing angle of the slewing body and a holding state of the holder which are associated with each other;
   an extraction part for extracting from the records first records indicating a reversal to a slewing direction of the slewing body on a basis of the slewing angles registered in the operational data, extracting from the records before the first records a second record indicating releasing of the holding state, and extracting from the first records a third record immediately before which the second record is registered; and
   a determination part for determining the sorting destination of the object on the basis of the slewing angle registered in the third record.

2. The sorting destination determining device according to claim 1, wherein
   each record further includes a positional coordinate of the holder, and
   the determination part is configured to determine the sorting destination of the object on the basis of the slewing angle registered in the third record and the positional coordinate registered in the second record.

3. The sorting destination determining device according to claim 2, further comprising:
a calculation part for calculating, on a basis of the third record and the second record, input data including information on a slewing angle in the reversal to the slewing direction and coordinate information on a release position at which the object is released; and
a generation part for generating a predictive model for determining the sorting destination of the object, by performing a machine learning with teaching data including the input data and output data indicating the sorting destination of the object, wherein
the determination part is configured to determine the sorting destination of the object by the predictive model.

4. The sorting destination determining device according to claim 3, wherein
the predictive model includes a plurality of decision trees generated by a random forest,
the input data is an explanatory variable in the random forest,
the output data is a target variable in the random forest, and
the determination part is configured to determine the sorting destination of the object using the decision trees generated through the machine learning with the teaching data.

5. The sorting destination determining device according to claim 3, wherein the information on the slewing angle in the reversal to the slewing direction includes the slewing angle registered in the third record.

6. The sorting destination determining device according to claim 3, wherein the coordinate information on the release position includes the positional coordinate of the holder registered in the second record.

7. The sorting destination determining device according to claim 3, wherein the input data further includes an elapsed time until the slewing direction of the slewing body is reversed after the holder releases, and a moved distance of the slewing body until the slewing direction of the slewing body is reversed after the holder releases.

8. The sorting destination determining device according to claim 1, wherein the extraction part is configured to perform exponential smoothing of the slewing angles in the operational data, and to extract the first records on a basis of the exponentially smoothed slewing angles.

9. The sorting destination determining device according to claim 1, wherein the sorting operation includes:
an operation of
holding the object in an operation area,
slewing in a certain direction while holding the object,
releasing the object to thereby place the object at the sorting destination of the sorting destinations, and
returning to the operation area by slewing in a direction opposite to the certain direction; and
a repetition of the operation.

10. The sorting destination determining device according to claim 1, wherein
the operational data is sample data which have been obtained during a time when the working machine is in operation, and
the record further includes a sampling time.

11. The sorting destination determining device according to claim 1, wherein the slewing angle is a slewing angle to a reference position of the working machine.

12. The sorting destination determining device according to claim 1, wherein the second record is a record that indicates a first releasing of the holding state among a predetermined number of records before the first record.

13. A sorting destination determining method for a sorting destination determining device for determining a sorting destination of an object from operational data of a working machine including a slewing body and a holder for holding the object and configured to perform a sorting operation of sorting the object to a sorting destination among a plurality of sorting destinations under control by an operator, the sorting destination determining method comprising:
acquiring operational data having a plurality of chronologically registered records, each record including a slewing angle of the slewing body and a holding state of the holder which are associated with each other;
extracting from the records first records indicating a reversal to a slewing direction of the slewing body on a basis of the slewing angles registered in the operational data, extracting from the records before the first records a second record indicating releasing of the holding state, and extracting from the first records a third record immediately before which the second record is registered; and
determining the sorting destination of the object on the basis of the slewing angle registered in the third record.

14. A non-transitory computer readable recording medium storing a program for causing a computer to serve as a sorting destination determining device for determining a sorting destination of an object from operational data of a working machine including a slewing body and a holder for holding an object and configured to perform a sorting operation of sorting an object to a sorting destination among a plurality of sorting destinations under control by an operator, the program causing the computer to execute a process of:
acquiring the operational data having a plurality of chronologically registered records, each record including a slewing angle of the slewing body and a holding state of the holder which are associated with each other;
extracting from the records first records indicating a reversal to a slewing direction of the working machine on a basis of the slewing angles registered in the operational data, extracting from the records before the first records a second record indicating releasing of the holding state, and extracting from the first records a third record immediately before which the second record is registered; and
determining the sorting destination of the object on the basis of the slewing angle registered in the third record.

* * * * *